March 8, 1955

T. J. CANNING 2,703,647

BEET CLEANING AND ROCK COLLECTING APPARATUS

Filed June 28, 1951

Thomas J. Canning
INVENTOR.

March 8, 1955 T. J. CANNING 2,703,647
BEET CLEANING AND ROCK COLLECTING APPARATUS
Filed June 28, 1951 2 Sheets-Sheet 2

Thomas J. Canning
INVENTOR.
BY
Attorneys

2,703,647

BEET CLEANING AND ROCK COLLECTING APPARATUS

Thomas J. Canning, Nampa, Idaho, assignor of one-half to Guy D. Connealy

Application June 28, 1951, Serial No. 233,992

2 Claims. (Cl. 209—173)

This invention relates to new and useful improvements in cleaning apparatus and the primary object of the present invention is to provide an apparatus for cleaning vegetables, fruits and the like and having a means for collecting rocks and the like as the vegetables or fruits are moved through an agitating and cleaning zone.

Another important object of the present invention is to provide a beet cleaning and rock collecting apparatus including a tank divided into two compartments with a conveying and agitating means in each compartment, together with a valve member at each end of the tank whereby beets or the like may be prevented from passing through a selected one of the compartments, and thereby permitting alternate use of the compartments and continuous use of the apparatus while the unused compartment is being cleaned.

A further object of the present invention is to provide a beet cleaning and rock collecting device involving a plurality of perforated tubes mounted in a tank and connected to a source of fluid that will be directed through the tubes and into a tank to agitate beets moving through the tank.

A still further aim of the present invention is to provide an apparatus of the aforementioned character that is simple and practical in construction, strong and reliable in use, efficient and durable in operation, inexpensive to manufacture, install and service, and otherwise well adapted for the purposes for which the same is intended.

Other objects and advantages, reside in the details of construction and operation as more fully hereinafter described and claimed, reference being had to the accompanying drawings forming part hereof, wherein like numerals refer to like parts throughout, and in which:

Figure 1:
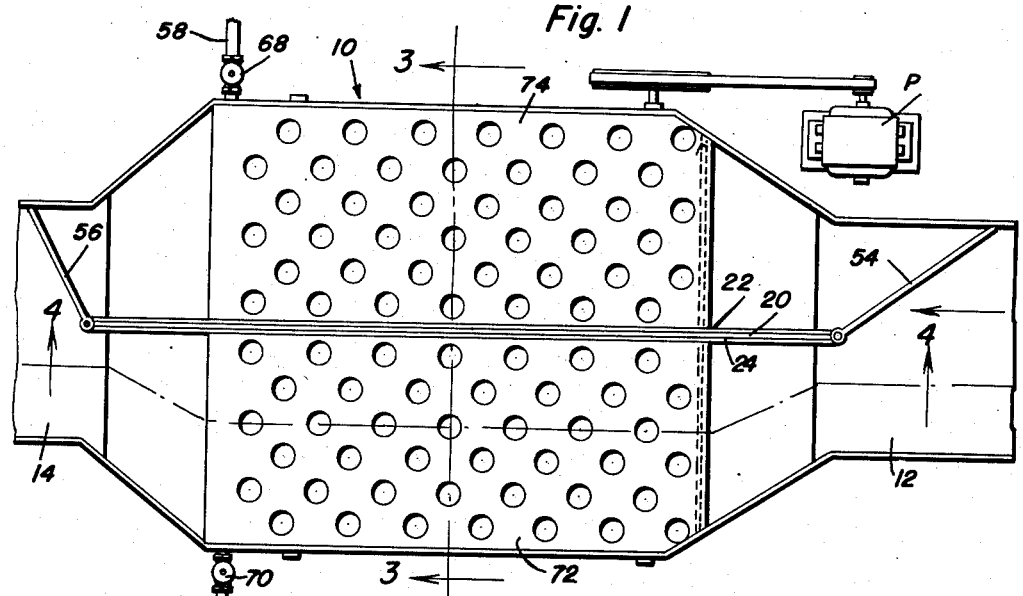
Figure 1 is a plan view of the present invention with the cover thereon.

Referring now to the drawings in detail, wherein for the purpose of illustration, there is disclosed a preferred embodiment of the present invention, the numeral 10 represents a tank or horizontally suported chamber having an entrance end 12 and an exit end 14.

The tank 10 is composed of two longitudinal compartments 16 and 18 and a longitudinal partition 20 is suitably fixed between the adjacent inner vertical walls 22 and 24 of the compartments. The compartments 16 and 18 are formed with inverted pyramidal bottoms 26 and 28 whose apices are attached to drain conduits 30 and 32 having manually actuated valves 34 and 36 at their upper portions.

Figure 4:
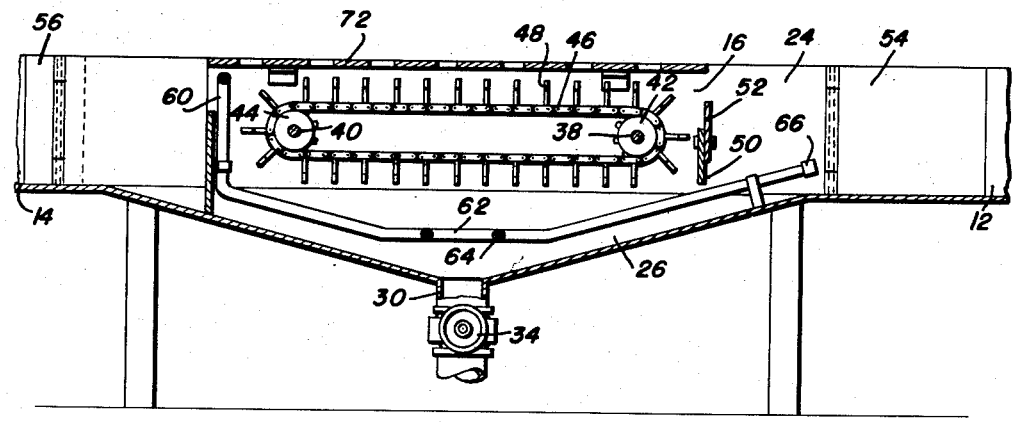
Figure 4 is a longitudinal vertical sectional view taken substantially on the plane of section line 4—4 of Figure 1; and, Figure 5 is a fragmentary perspective view of one of the conveyors used in the present invention.
Figure 5:
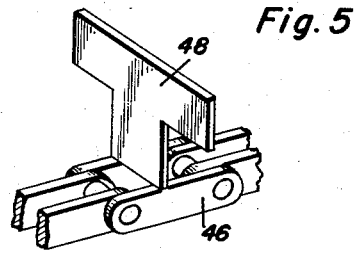

A pair of spaced parallel shafts 38 and 40 extend transversely of the tank 10 and are journaled in apertures in the side walls of the compartments. The shafts 38, 40 support groups of sprockets 42 and 44 over which sprocket chains 46 are engaged. Substantially T-shaped transverse conductor fingers 48 are fixed to alternate links of the chains and are staggered on alternate chains relative to those on intermediate chains. One end of the shaft 38 projects outwardly from the tank 10 and is operatively connected to a source of power P whereby the chains 46 will be rotated as a unit counter-clockwise when viewing Figure 4.

At the entrance end 12 of the tank, the side walls of each compartment supports a horizontally disposed transverse cross member 50 between said end 12 and the chains 46. Vertically adjustable horizontal baffles 52 are slidably adjustably secured to the members 50 by fasteners received in vertical slots in the cross members.

The ends of the partition 20 and walls 22, 24 swingably support gate valve members 54 and 56 at the entrance and exit ends 12, 14 that may be manually actuated to block a selected one of the compartments.

A supply pipe 58 extends transversely through the side walls of the compartments at the exit ends thereof. This pipe is formed of a plurality of coaxial sections that are joined by T-fittings having depending portions that are coupled to the shorter ends of L-shaped perforated tubes 60 that are positioned in the compartments. The tubes 60 are spaced parallel to each other and extend longitudinally of the compartments with their longer legs located below the conveyors.

The central portions 62 of the tubes 60 are bent horizontally over the bottoms 26, 28 and the portions 62 of the central pair of tubes in each compartment are joined by perforated cross tubes 64. The outer ends of the longer legs of the tubes 60 are closed by caps 66.

A valve 68 is provided in the conduit or pipe 58 and a second valve 70 is also in the conduit 58. The valve 70 is manually closed and the valve 68 manually opened in order to permit fluid from a source to be impelled, under pressure from a compressor or the like, through the pipe 58 and the tubes 60 and 64 and into a bath in the compartments to agitate fruits, vegetables or the like being moved through the compartments by the conveyors 46.

Removable perforated covers 72 and 74 extend over the compartments 16 and 18 and confine articles being moved by the conveyors from the entrance 12 to the exit 14 within the tank.

Figure 2:
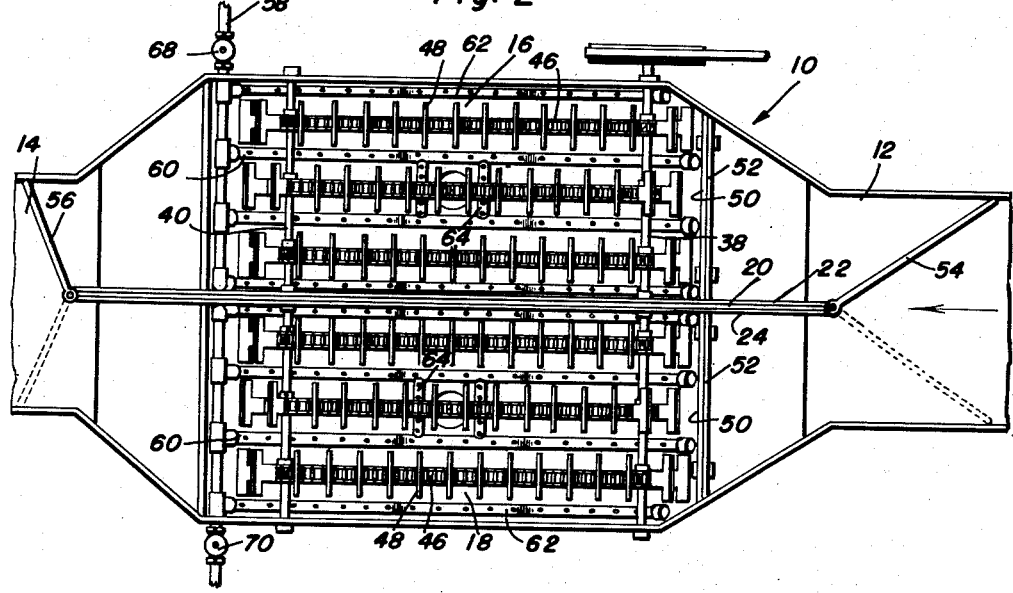
Figure 2 is a view similar to Figure 1 but with the cover removed.
Figure 3:
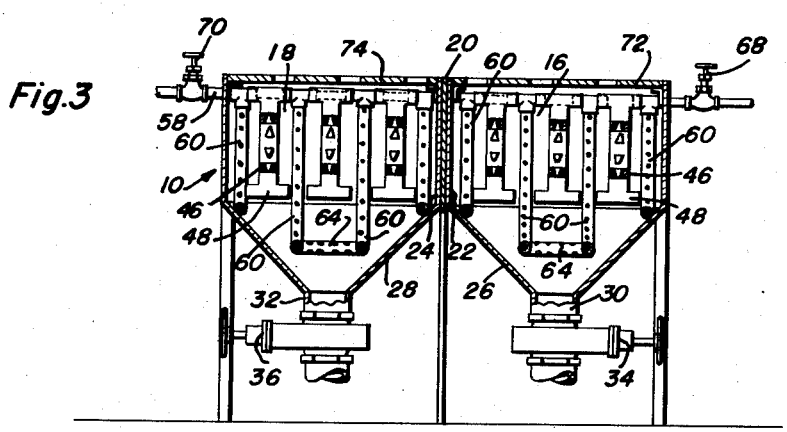
Figure 3 is a transverse vertical sectional view taken on the plane of section line 3—3 of Figure 1.

In practical use of the present invention, and using but one compartment, the gates or valve members 54 and 56 are swung to block one compartment as shown in Figures 1 and 2. The articles to be cleaned are then floated down a trough through the entrance 12, past the members 50, 52 of the open compartment and to the conveyors of the open compartment.

The bath in the open compartment will be agitated by the fluid passing from the perforated tubes and the articles directed to the exit 14. During the period the articles are in the compartments rocks and such foreign matter will pass down the bottom of the open compartment and into the drain attached thereto. The air or fluid circulated through the open compartment by way of the perforate tubes will keep beets or the like afloat and permit the rocks to settle. The tubes 64 will prevent mud and dirt from settling in the bottom of the open compartment.

Having described the invention, what is claimed as new is:

1. In a beet cleaning apparatus, an elongated compartment having entrance and exit ends, respectively, adapting the compartment for the flow of liquid therethrough, a plurality of side by side endless conveyor chains extending longitudinally in said compartment in spaced relation between said ends and having cross conductor fingers thereon, means for driving said chains in unison for propelling beets floating in the liquid through said compartment between the entrance and exit ends, a supply pipe for fluid under pressure extending across said compartment at the exit end, a plurality of L-shaped spray pipes depending from said supply pipe and extending along said compartment adjacent its bottom and between said chains for agitating the liquid to float the beets to said conductor fingers, and means in said compartment between said entrance end and said chains for obstructing rocks in the fluid to prevent the same from entering said compartment.

2. The combination of claim 1, and spray pipes cross connecting adjacent L-shaped spray pipes.

(References on following page)

References Cited in the file of this patent

UNITED STATES PATENTS

| Number | Name | Date |
|---|---|---|
| 864,829 | Callow | Sept. 3, 1907 |
| 989,915 | Maguin | Apr. 18, 1911 |
| 1,091,534 | Reynolds | Mar. 31, 1914 |
| 1,195,264 | Pennington | Aug. 22, 1916 |
| 1,617,096 | Bell | Feb. 8, 1927 |
| 1,643,596 | Zuckerman | Sept. 27, 1927 |
| 1,716,712 | Stepich | June 11, 1929 |
| 1,770,027 | Dean | July 8, 1930 |
| 1,815,548 | Covington | July 21, 1931 |
| 1,871,359 | Carmichael | Aug. 9, 1932 |
| 1,999,817 | Martin | Apr. 30, 1935 |
| 2,196,119 | Mitchell | Apr. 2, 1940 |
| 2,319,457 | Hirst | May 18, 1943 |
| 2,369,863 | Sevey | Feb. 20, 1945 |
| 2,538,285 | Swayze | Jan. 16, 1951 |

FOREIGN PATENTS

| Number | Country | Date |
|---|---|---|
| 303,393 | Great Britain | Dec. 4, 1928 |
| 325,031 | Great Britain | Feb. 13, 1930 |
| 451,402 | Great Britain | Aug. 5, 1936 |
| 973,152 | France | Feb. 8, 1951 |